US008155123B2

(12) United States Patent
Guan (10) Patent No.: US 8,155,123 B2
(45) Date of Patent: Apr. 10, 2012

(54) METHOD, SYSTEM, AND DEVICE OF PACKET ROUTING FOR LOCALIZED MOBILITY MANAGEMENT NETWORK

(75) Inventor: Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 528 days.

(21) Appl. No.: 12/393,470

(22) Filed: Feb. 26, 2009

(65) Prior Publication Data
US 2009/0161604 A1   Jun. 25, 2009

Related U.S. Application Data (63) Continuation of application No. PCT/CN2007/000923, filed on Mar. 21, 2007.

(30) Foreign Application Priority Data

Aug. 31, 2006 (CN) .......................... 2006 1 0112353

(51) Int. Cl.
*H04L 12/28* (2006.01)
*H04L 12/50* (2006.01)

(52) U.S. Cl. ................................... 370/395.21; 370/401

(58) Field of Classification Search .......................... None
See application file for complete search history.

(56) References Cited

U.S. PATENT DOCUMENTS

| 2002/0009066 A1* | 1/2002 | Shimizu et al. ............... 370/338 |
| 2004/0008664 A1* | 1/2004 | Takahashi et al. ............ 370/351 |
| 2004/0067754 A1* | 4/2004 | Gao et al. ...................... 455/442 |
| 2004/0095913 A1 | 5/2004 | Westphal |
| 2004/0125795 A1* | 7/2004 | Corson et al. ................. 370/356 |
| 2004/0136348 A1* | 7/2004 | Han ............................... 370/338 |
| 2005/0213545 A1* | 9/2005 | Choyi et al. ................... 370/338 |
| 2005/0259631 A1 | 11/2005 | Rajahalme |
| 2005/0286504 A1* | 12/2005 | Kwon ........................... 370/356 |
| 2006/0018291 A1* | 1/2006 | Patel et al. .................... 370/335 |

(Continued)

FOREIGN PATENT DOCUMENTS

CN   1484407 A   3/2004

(Continued)

OTHER PUBLICATIONS

European Search Report for Application No. 07720497.2, dated Oct. 26, 2009.

(Continued)

*Primary Examiner* — Hassan Phillips
*Assistant Examiner* — Eunsook Choi
(74) *Attorney, Agent, or Firm* — Finnegan, Henderson, Farabow, Garrett & Dunner LLP (57) ABSTRACT

A method of packet routing for an LMM network includes: by an LMA, determining that both a sending end node and a receiving end node are located in an LMM domain controlled by the LMA, and starting a route optimization; directly forwarding, by an access device attached to the sending end node, a packet to be sent to the receiving end node to an access device attached to the receiving end node without being forwarded by the LMA; and forwarding, by the access device attached to the receiving end node, to the receiving end node. A system of packet routing for an LMM network includes a sending end node, a receiving end node, an access device attached to the sending end node, an access device attached to the receiving end node, and an LMA.

15 Claims, 5 Drawing Sheets

U.S. PATENT DOCUMENTS

| | | | |
|---|---|---|---|
| 2006/0199588 A1* | 9/2006 | Gao et al. | 455/442 |
| 2007/0005971 A1* | 1/2007 | Leung et al. | 713/171 |
| 2009/0135822 A1* | 5/2009 | Hirano et al. | 370/392 |
| 2010/0182917 A1* | 7/2010 | Valko et al. | 370/252 |

FOREIGN PATENT DOCUMENTS

| | | |
|---|---|---|
| CN | 1706152 (A) | 12/2005 |
| CN | 1770742 A | 5/2006 |
| CN | 1784059 A | 6/2006 |
| CN | 100596101 C | 3/2008 |

OTHER PUBLICATIONS

B. Sarikaya, Architectural Framework for Global and Localized Mobility Management draft-sarikaya-mobileip-lmmframework-01.txt, Alcatel, Internet Draft, Oct. 2002, 15 pages.

Youn-Hee Han et al., Route Optimization Support for Localized Mobility Management Based on IPv6 <draft-han-mobileip-rolmmv6-00.txt>, Samsung AIT, Internet Draft, Jul. 2002, 11 pages.

Bo Hu et al., Local Route Optimization in Hierarchical Mobile IPv6 Networks from Topologies Perspective, Proceedings of ISCIT2005, Broadband Network Research Center, State Key Laboratory of Networking and Switching, Beijing University of Posts and Telecommunications, China, 2005, pp. 787-790.

J. Kempf et al., Requirements and Gap Analysis for IP Local Mobility (draft-ietf-netlmm-nohost-req-00.txt, Internet Draft, Feb. 2006, 23 pages.

J. Kempf et al., Problem Statement for IP Local Mobility (draft-ietf-netlmm-nohost-ps-00.txt, Internet Draft, Feb. 2006, 10 pages.

G. Giaretta et al., NetLMM Protocol draft-giaretta-netlmm-dt-protocol-00.txt, NETLMM Internet Draft, Jun. 19, 2006, 49 pages.

International Search Report in International Application No. PCT/CN2007/000923.

European Patent Office Communication pursuant to Article 94(3) EPC, European search opinion for Application No. 07720497.2, mailed Feb. 10, 2011, Huawei Technologies C., LTD.

* cited by examiner

METHOD, SYSTEM, AND DEVICE OF PACKET ROUTING FOR LOCALIZED MOBILITY MANAGEMENT NETWORK

CROSS REFERENCE

This application is a continuation application of International Application No. PCT/CN2007/000923, filed Mar. 21, 2007, which claims priority to Chinese Patent Application No. 200610112353.6, filed Aug. 31, 2006.

BACKGROUND

1. Field of the Technology

The present invention relates to a technology of localized mobility management (LMM) network, and more particularly to a method, system, and device of packet routing for an LMM network.

2. Background

A network-based localized mobility management (NETLMM) system is capable of supporting the movement of a mobile terminal within a certain area (belonging to the same local management domain) without changing the IP address before and after the movement. The mobility function is achieved through a network, and has no special requirements on the terminal. These advantages may promote the application of the NETLMM system.

Figure 1:
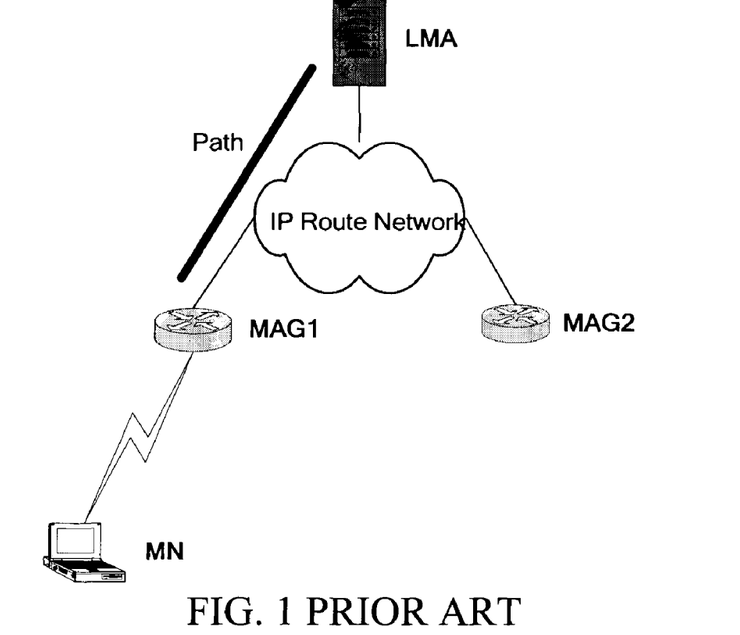
FIG. 1 is a structural view of a NETLMM framework with an LMA or LMAP.

In response to this requirement, the IETF has established a special working group called NETLMM, for research, and proposed a NETLMM basic protocol solution and protocol flow. FIG. 1 is a structural view of a NETLMM framework with a single local mobility anchor point (LMA or LMAP).

The localized mobility management (LMM) follows the framework shown in FIG. 1. The LMA stores and maintains routing information to each mobile node (MN), and each piece of routing information is directed to a media access gateway (MAG) that the MN is currently accessing. Packets sent to or from the MN are forwarded by the LMA. When an MN moves from one MAG to a new MAG, the new MAG sends a message to the LMA to update the routing information corresponding to the MN on the LMA. The movement of MN is detected through a mobility detection mechanism by network equipment, so the MN does not need to have a special mobile protocol capability. Before and after the movement, the IP of the MN remains unchanged, and the undergoing session will not be interrupted, thereby achieving the mobile capability. In this framework, the MAGs may be replaced by access routers (ARs).

Figure 2:
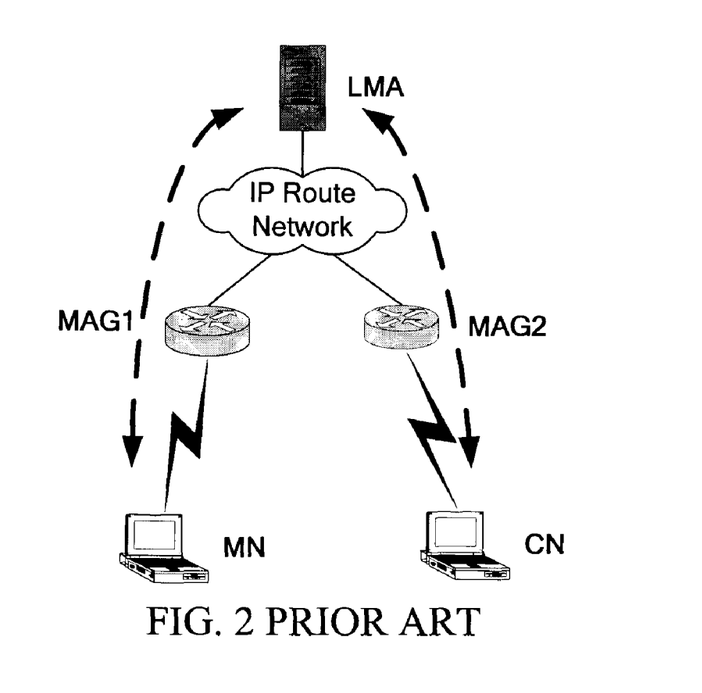
FIG. 2 shows a data forwarding path between an MN and a CN thereof in the prior art.

An LMM protocol implemented by network devices is also proposed by the IETF based on the above framework. FIG. 2 shows a data forwarding path between an MN and a corresponding node (CN) thereof according to this protocol. As seen from this protocol, data sent from the MN must pass through an MAG and an LMA, and then routed to the destination after arriving at the LMA. As such, even if the CN and the MN are under different MAGs in the same NETLMM domain, data packets must be forwarded by the LMA. That is, the data packets are transmitted in a path of: MN→MAG1-tunnel→LMA-tunnel→MAG2→CN. As a result, alternative routing occurs, which may increase the transmission delay and reduce the system efficiency.

SUMMARY

Accordingly, the present invention is directed to a method and system of packet routing for an LMM network as well as an LMA and an access device attached to a sending end node used in the provided system, so as to implement the route optimization and reduce the transmission delay.

To achieve the above objectives, the present disclosure adopts the following technical solutions.

A method of packet routing for an LMM network includes the following steps.

It is determined that both a sending end node and a receiving end node are located in the same LMM domain controlled by an LMA, and a route optimization is enabled. A packet to be sent to the receiving end node is directly forwarded by an access device attached to the sending end node to an access device attached to the receiving end node, and forwarded by the access device attached to the receiving end node to the receiving end node.

A system of packet routing for an LMM network includes a sending end node, a receiving end node, an access device attached to the receiving end node, an LMA, and an access device attached to the sending end node. The sending end node interconnects with the access device attached to the sending end node. The LMA respectively interconnects with the access device attached to the sending end node and the access device attached to the receiving end node. The receiving end node interconnects with the access device attached to the receiving end node.

The LMA is adapted to send a notification for enabling a route optimization after determining that both the sending end node and the receiving end node are located in an LMM domain controlled by itself.

The access device attached to the sending end node is adapted to directly forward a packet to be sent to the receiving end node to the access device attached to the receiving end node after receiving the notification for enabling the route optimization sent by the LMA.

An LMA for implementing a route optimization includes a packet resolution module and a forward module.

The packet resolution module is adapted to receive a packet and determine whether both a sending end node and a receiving end node of the packet are located in a same LMM domain controlled by the device before the route optimization is enabled and if so, notify the forward module.

The forward module is adapted to receive the notification sent by the packet resolution module, enable the route optimization, and send a notification for triggering the route optimization.

An access device attached to a sending end node includes an interface module and a control module.

The control module is adapted to send a control packet for sending a packet to an LMA in the network before a route optimization is enabled, receive a notification for triggering the route optimization, and send a control packet to the interface module after receiving the notification, which notifying the interface module of sending the packet to an access device attached to a receiving end node in the network.

The interface module is adapted to receive the control packet for sending the packet to the LMA in the network and send the packet to the LMA in the network after receiving the control packet, then receive and forward the notification for triggering the route optimization, and receive the control packet for sending the packet to the access device attached to the receiving end node in the network and send the packet to the access device attached to the receiving end node in the network after receiving the packet.

In the above technical solutions, in the embodiments of the present invention, when the LMA determines that both the sending end node and the receiving end node are located in the LMM domain controlled by the LMA, the route optimization is enabled. A packet to be sent to the receiving end node is directly forwarded by the access device attached to the sending end node to the access device attached to the receiving end node without being forwarded through the LMA, and then forwarded by the access device attached to the receiving end node to the receiving end node. In this manner, when the sending end node and the receiving end node are located in the same LMM domain controlled by the LMA, the packet can be forwarded between the two nodes without being forwarded by the LMA. Therefore, the route optimization is realized and the transmission delay is reduced.

Further, the route optimization strategy decision function may be set in the LMA and the access device attached to the sending end node, so that it is possible to determine whether a route optimization may be or needs to be performed according to network deployment and the route optimization strategy preset by the administrator. Therefore, a determination step may be added before the route optimization is performed so as to make the routing decision-making for packet forwarding more flexible. When no route optimization is required or no optimized route path is available, the route optimization will not be performed, and instead the packet is forwarded through the original path, so as to improve the packet forwarding efficiency.

BRIEF DESCRIPTION OF THE DRAWINGS

The present invention will become more fully understood from the detailed description given herein below for illustration only, and thus are not limitative of the present invention.

DETAILED DESCRIPTION OF THE EMBODIMENTS

In order to make the objectives, technical solutions, and advantages of the present invention comprehensible, specific embodiments accompanied with drawings are described in detail below.

In the embodiments of the present invention, after the LMA determines that both the sending end node and the receiving end node are located in the LMM domain controlled by the LMA, the route optimization is started. A packet to be sent to the receiving end node is directly forwarded by the access device attached to the sending end node to the access device attached to the receiving end node without being forwarded by the LMA, and then forwarded by the access device attached to the receiving end node to the receiving end node.

Figure 3:
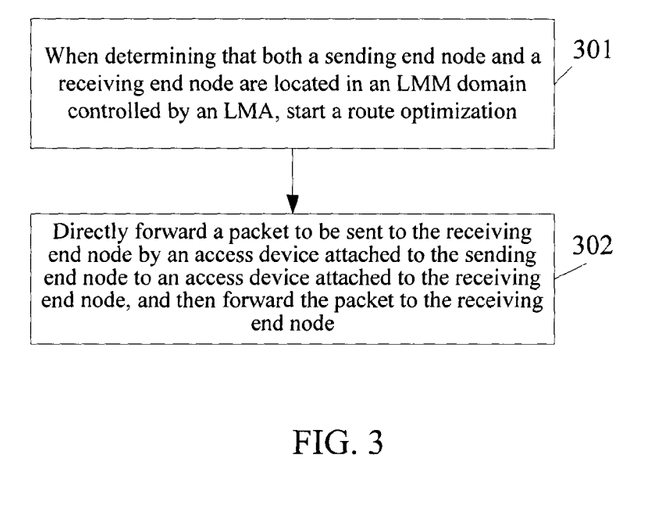
FIG. 3 is a general flow chart of a method of packet routing for an LMM network in the present invention.

FIG. 3 is a general flow chart of a method of packet routing for an LMM network in an embodiment of the present invention. Referring to FIG. 3, the method includes the following steps.

In Step 301, after an LMA determines that both a sending end node and a receiving end node are located in an LMM domain controlled thereby, a route optimization is enabled.

In Step 302, a packet to be sent to the receiving end node is directly forwarded by an access device attached to the sending end node to an access device attached to the receiving end node, and then forwarded to the receiving end node by the access device.

In the above method, after the LMA determines that both the sending end node and the receiving end node are located in the LMM domain controlled thereby, the packet is directly forwarded by the access device attached to the sending end node to the access device attached to the receiving end node, and then forwarded by the access device attached to the receiving end node to the receiving end node. In this manner, the packet does not need to be forwarded by the LMA. Therefore, the route optimization is realized and the transmission delay is reduced.

Figure 4:
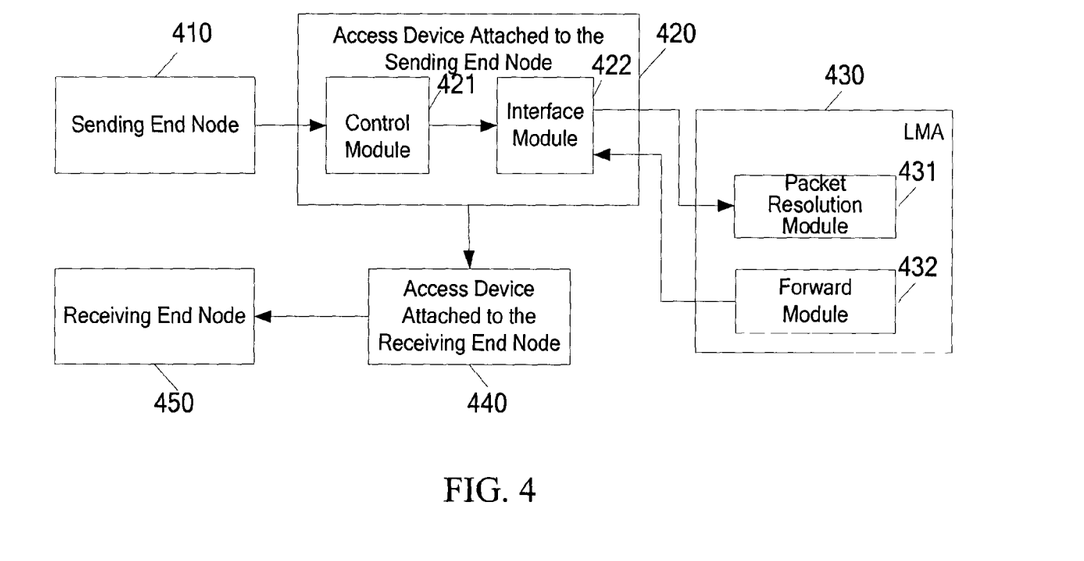
FIG. 4 is a general structural view of a system of packet routing for an LMM network in the present invention.

FIG. 4 is a general structural view of a system of packet routing for an LMM network in an embodiment of the present invention. Meanwhile, an overall structure of an LMA and an overall structure of an access device attached to a sending end node provided in an embodiment of the present invention are also shown in the figure. Referring to FIG. 4, the system includes a sending end node 410, an access device 420 attached to the sending end node, an LMA 430, a receiving end node 450, and an access device 440 attached to the receiving end node. The sending end node 410 is connected to the access device 420 attached to the sending end node. The LMA 430 is respectively connected to the access device 420 attached to the sending end node and the access device 440 attached to the receiving end node. The receiving end node 450 is connected to the access device 440 attached to the receiving end node. The LMA 430 includes a packet resolution module 431 and a forward module 432. The LMA 430 has the overall structure of the LMA provided in the embodiment of the present invention. The access device 420 attached to the sending end node includes a control module 421 and an interface module 422. The access device 420 attached to the sending end node has the overall structure of the access device attached to the sending end node provided in the embodiment of the present invention.

In this system, the sending end node 410 is adapted to send a packet to the receiving end node 450.

In the access device 420 attached to the sending end node, the control module 421 is adapted to receive a notification for triggering a route optimization forwarded by the interface module 422 and then control the interface module 422 to directly forward the packet to be sent to the receiving end node 450 to the access device 440 attached to the receiving end node. The interface module 422 is adapted to send the packet to be sent to the receiving end node 450 under the control of the control module.

In the LMA 430, the packet resolution module 431 is adapted to receive the packet sent by the access device 420 attached to the sending end node before the route optimization is enabled, and notify the forward module 432 when determining that both the sending end node 410 and the receiving end node 450 are located in an LMM domain controlled thereby. The forward module 432 is adapted to receive the notification sent by the packet resolution module 431, enable the route optimization, and send the notification for triggering the route optimization to the access device 420 attached to the sending end node.

The access device 440 attached to the receiving end node is adapted to receive the packet forwarded by the access device 420 attached to the sending end node and forward the packet to the receiving end node 450.

In the above system, the access device 420 attached to the sending end node and the access device 440 attached to the receiving end node may be MAGs or ARs. Through this system, when the sending end node and the receiving end node are located in the same LMM domain controlled by the LMA, the packet sent by the sending end node to the receiving end node can be directly forwarded by the access device attached to the sending end node to the access device attached to the receiving end node without being forwarded by the LMA. Therefore, the route optimization is realized and the transmission delay is reduced.

The specific implementation of the present invention will be illustrated below with embodiments.

Embodiment 1

In this embodiment, it is assumed that a sending end node MN and a receiving end node CN of two communication parties belong to the same LMM domain, and respectively access the LMM network through an MAG1 and an MAG2. The access, address allocation, and location update processes of the two parties follow the "LMM protocol implemented by network devices" mentioned in the prior art, so the details will not be described herein again.

Figure 5:
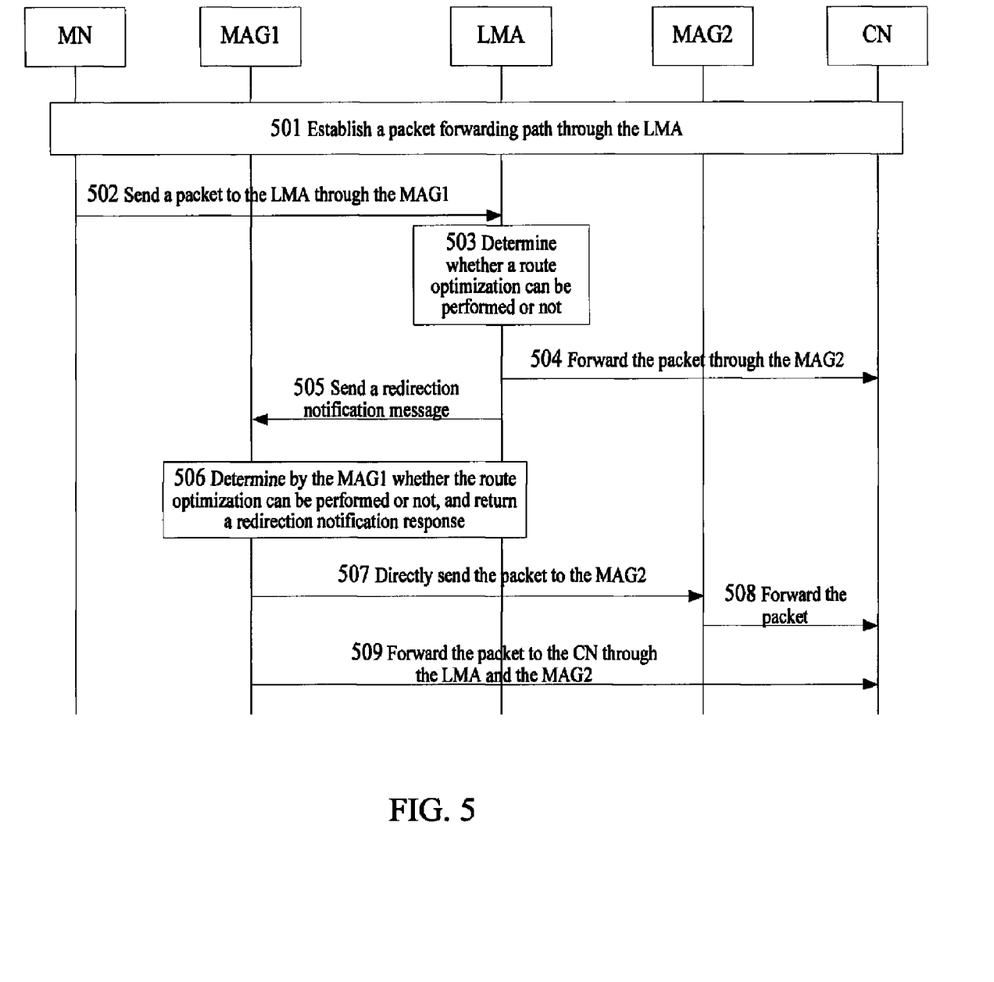
FIG. 5 is a detailed flow chart of a method of packet routing for an LMM network in Embodiment 1 of the present invention.

FIG. 5 is a detailed flow chart of a method of packet routing for an LMM network in Embodiment 1 of the present invention. Referring to FIG. 5, the method includes the following steps.

In Step 501, a packet forwarding path is established.

In this step, the MN and the CN first perform data forwarding through a conventional path. That is, an LMA stores access location information of the MN and the CN, the MAG1 and the MAG2 respectively store packet forwarding mode information of the MN and the CN, and tunnels between the LMA and the MAG1 as well as between the LMA and the MAG2 are established. The tunnels between the LMA and the MAG1 as well as between the LMA and the MAG2 are defaulted as IP in IP encapsulation. Here, IP in IP means an IP data packet is used as a payload of another IP data packet.

In Step 502, the MN sends a packet to the LMA through the MAG1.

In this step, the MAG1 encapsulates the packet sent by the MN into the tunnel and then sends the packet to the LMA.

In this embodiment, the LMA obtains the packet sent by the MN to the CN through the established conventional packet forwarding path. It should be understood that, in practice, the LMA may also obtain the packet in other ways, and the details will not be given here.

In Step 503 and 504, the LMA forwards the packet to the CN through the MAG2 and determines whether a route optimization can be enabled or not. If yes, perform Steps 504 to 508; otherwise, perform Step 509.

In the steps, the LMA forwards the packet received in Step 502 to the CN through the MAG2 and determines whether a route optimization can be started or not. In particular, the LMA determines whether a route optimization can be enabled or not in the following two steps.

A. The LMA receives and decapsulates the packet to extract a destination address of the packet, and determines whether the next hop delivery node of the packet in the IP network belongs to the same LMM domain according to the destination address of the packet. If yes, the sending end node and the receiving end node are considered to be located in the same LMM domain controlled by the LMA. If the receiving end node CN is also founded in this LMM domain, Determination B is performed; otherwise, it is considered that the route optimization cannot be enabled and Step 509 will be performed.

B. This step determines whether a route optimization can be enabled or not according to a route optimization strategy deployed by the network and/or preset by an administrator.

Even if the MN and the CN communicate under different MAGs in the same network, the communication path may not be possibly optimized, or does not need to be optimized, or is not worth to be optimized. That is, even if the two communication parties belong to the same LMM domain, the LMA may not necessarily trigger a route optimization function in certain cases. Indeed, the start of a route optimization depends on a route optimization strategy deployed by the network or preset by an administrator, or codetermined by the deployment of the network and the presetting of the administrator.

For example, if every MAG is only connected to the LMA, all communication packets of the two communication parties have to pass through the LMA in any case. Thus, the route optimization cannot be realized anyway, so there is no need to perform the route optimization. In addition, if the network deploys only to monitor the traffic flow at the LMA, the optimization cannot be performed; otherwise, a part of the traffic flow will no longer be forwarded by the LMA, and the LMA thus cannot monitor the traffic flow.

In Step 505, the LMA sends a redirection notification message to the MAG1.

In this step, after determining that the route optimization can be performed, the LMA triggers and sends a redirection notification message to the MAG1 to notify the MAG1 that the packet to be sent to the CN can be directly delivered to the MAG2 without being forwarded by the LMA. The redirection notification message contains node address information of the MN and the CN.

In Step 506, the MAG1 determines whether the route optimization can be performed or not, and returns a redirection notification response to the LMA. If the route optimization can be performed, carry out Steps 507 to 508; otherwise, proceed to Step 509.

On receiving the redirection notification message and knowing that the LMA allows to perform the route optimization, the MAG1 may directly forward the subsequent packet to the MAG2, or further determine whether the route optimization can be performed or not. In this embodiment, the latter is adopted.

In this step, the method for determining whether the route optimization can be performed or not is to determine whether the route optimization is allowed to be performed according to a route optimization strategy. The route optimization strategy may be deployed by the network or preset by an administrator, or codetermined by the deployment of the network and the presetting of the administrator. That is, the deployment of the route optimization strategy may also be implemented in the MAG1. The route optimization strategy may be preconfigured in the MAG1 or carried in the redirection message.

The redirection notification response returned by the MAG1 to the LMA contains the result of whether the route optimization can be performed or not.

In Step 507, the MAG1 directly sends the packet to the MAG2.

In this step, after the MAG1 allows performing the route optimization, the subsequent packet to be sent to the CN is directly sent to the MAG2 without being forwarded by the LMA.

In Step 508, the MAG2 forwards the packet to the CN.

In Step 509, the MAG1 forwards the packet to the CN through the LMA and the MAG2.

If the LMA or the MAG1 does not allow performing the route optimization, the MAG1 still forwards the packet to the CN through the LMA and the MAG2 according to the packet forwarding path established in Step 501 and then ends the packet forwarding flow.

Figure 6:
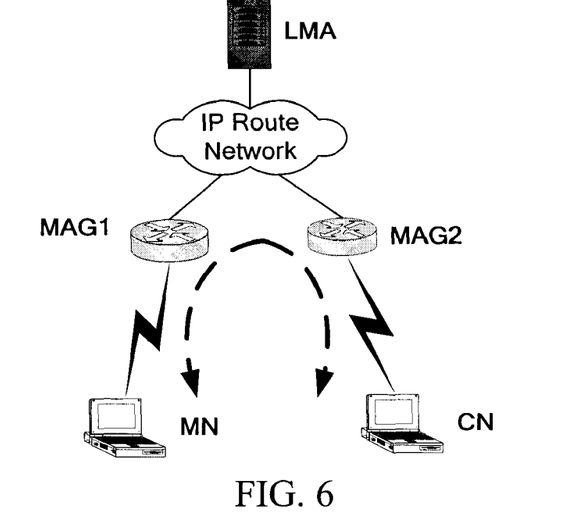
FIG. 6 shows an optimized packet forwarding path in Embodiment 1 of the present invention.

As seen from the above, in this flow, if the LMA and the MAG1 allow performing the route optimization, the original packet forwarding path MN→MAG1→LMA→MAG2→CN is optimized into MN→MAG1→MAG2→CN, i.e., the packet forwarding path shown in the broken line in FIG. 6.

In the embodiment shown in FIG. 5, both the MN and the CN access the network through MAGs, and of course, may also access the network through ARs.

Figure 7:
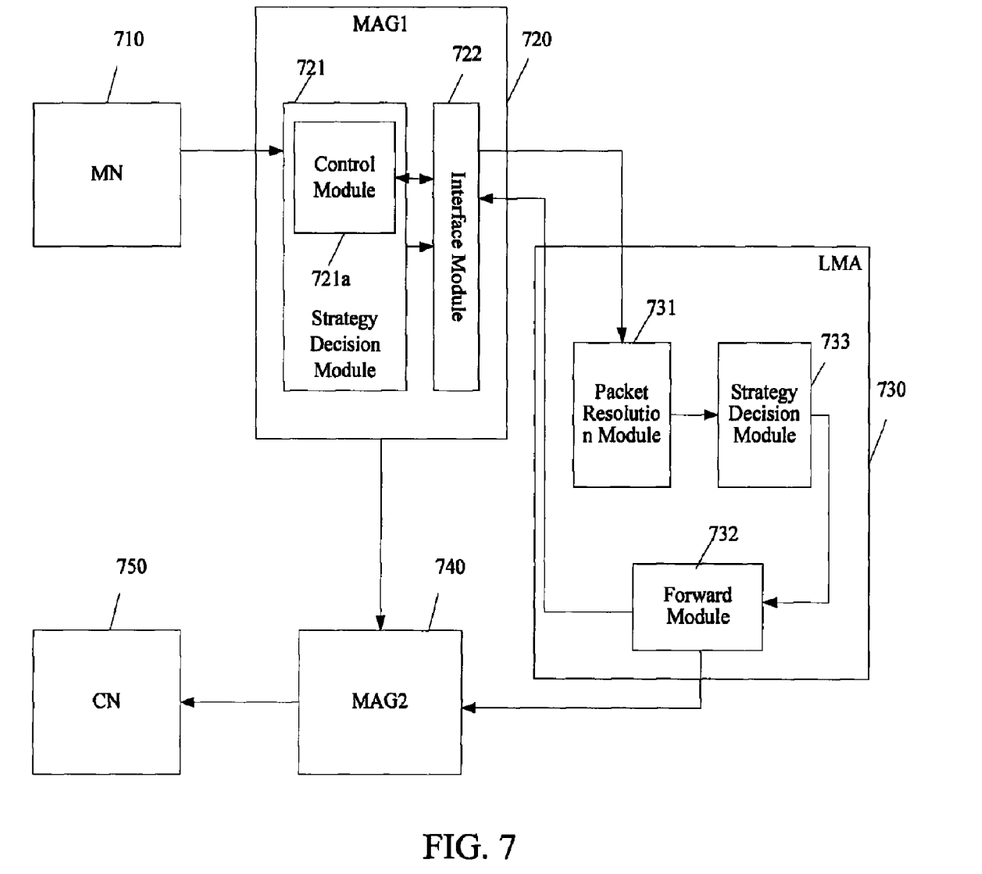
FIG. 7 is a structural view of a system of packet routing for an LMM network in Embodiment 1 of the present invention.

The method of this embodiment has been illustrated in detail above, and the specific implementation of the system will be illustrated hereinafter. FIG. 7 is a structural view of a system of packet routing for an LMM network in Embodiment 1 of the present invention.

Referring to FIG. 7, the system includes an MN 710, an MAG1 720, an LMA 730, an MAG2 740, and a CN 750. The LMA 730 includes a packet resolution module 731, a forward module 732, and a strategy decision module 733. The LMA 730 is a specific implementation of the LMA provided in the embodiment of the present invention. The MAG1 720 includes a control module 721 and an interface module 722. The control module 721 includes a strategy decision module 721a. The MAG1 720 is a specific implementation of the access device attached to the sending end node provided in the embodiment of the present invention.

In this system, the MN 710 is adapted to send a packet to be sent to the CN 750 to the MAG1 720. In the MAG1 720, the control module 721 is adapted to control the interface module 722 to forward the packet sent by the MN 710 to the LMA 730 before a route optimization is enabled.

In the LMA 730, the packet resolution module 731 is adapted to receive and examine the packet sent by the MAG1 720 to extract a destination address of the packet, trigger the strategy decision module 733 to make a strategy decision, determining whether the both the sending end node and the receiving end node are located in same LMM domain controlled by the LMA, and forward the packet to the forward module 732. The forward module 732 is adapted to forward the packet to the MAG2 740. The strategy decision module 733 is adapted to send a message for allowing the route optimization to the forward module 732 according to a route optimization strategy deployed by the network and/or preset by an administrator if the route optimization is allowed. The forward module 732 is adapted to send a notification for triggering the route optimization to the MAG1 720. In this embodiment, the notification for triggering the route optimization is a redirection notification message. It should be understood that, in practice, other types of messages may also be defined as long as they can achieve the purpose of notifying the access device attached to the sending end node that the route optimization can be performed.

In the MAG1 720, the strategy decision module 721a in the control module 721 is adapted to receive the notification for triggering the route optimization forwarded by the interface module 722, and control the interface module 722 to directly forward the packet to be sent to the CN 750 to the MAG2 740 according to the route optimization strategy deployed by the network and/or preset by the administrator if the route optimization is allowed; otherwise, control the interface module 722 to still send the subsequent packet to the LMA 730. The MAG2 740 is adapted to receive the packet forwarded by the MAG1 720 and forward the packet to the CN 750. Seen from the above, the MN 710, the MAG1 720, the MAG2 740, and the CN 750 in the system shown in FIG. 7 are specific aspects of the sending end node 410, the access device 420 attached to the sending end node, the access device 440 attached to the receiving end node, and the receiving end node 450 in the system shown in FIG. 4, and have the same functions as those in FIG. 4 except for the additional strategy decision function of the MAG1 720. It should be understood that, the MAG1 and the MAG2 may be replaced by ARs. The specific embodiment of the method in FIG. 5 can be implemented in the above system. According to the implementation of this embodiment, if the route optimization is allowed, the forwarding path of the packet between the sending end node and the receiving end node that belong to the same LMA can be optimized, and the transmission delay is reduced.

In this embodiment, the route optimization strategy may be deployed at two places, i.e., the LMA and the MAG1, and both can control whether to really trigger the route optimization or not. The deployment of the route optimization strategy is added to achieve the purpose that the route optimization will not be performed in some cases that the optimization does not need to be optimized or cannot be optimized. The reason is that, in the above-mentioned cases, even if the optimization is performed, the packet may still be forwarded according to the originally established path due to reasons such as every path between the MAG1 and the MAG2 passing through the LMA. At this point, the route optimization may increase the signaling transmission cost. By adopting the method deploying the route optimization strategy, the route optimization can be flexibly handled, and thus become more efficient.

It should be understood that, in practice, the route optimization strategy may be deployed in neither the LMA nor the MAG1. In this system structure, neither the LMA nor the MAG1 includes a strategy decision module. Alternatively, in practice, the route optimization strategy may also be deployed in the MAG1 or the LMA. In this system structure, the LMA or the MAG1 that is not deployed with the route optimization strategy does not include a strategy decision module, while the other that is deployed with the route optimization strategy still includes a strategy decision module.

Embodiment 2

In this embodiment, the same packet forwarding path as shown in the flow of FIG. 5 is adopted. In addition, it is assumed that the redirection notification message sent by the LMA to the MAG1 has a certain validity period, and the MAG1 directly forwards the packet within the validity period of the redirection notification message to the CN through the MAG2.

The situation of this embodiment is described as follows. In the process of packet forwarding, the receiving end node CN moves in the LMM domain, so that the MAG attached to the CN is changed from the original MAG2 to an MAG3. Since the CN moves in the LMM domain, the access device MAG3 attached to the CN after the movement is still located in the LMM domain controlled by the original LMA.

After the CN moves and the MAG of the CN is changed, the LMA obtains a location registration message of the new location (i.e., the MAG3) of the CN. At this point, the LMA queries redirection notification message records of all the MAGs. If the LMA finds that the access device of the receiving end node is the MAG2 in the redirection notification message sent by the LMA to the MAG1 and the message is within the validity period, the LMA triggers a redirection release message to release the redirection to the MAG2. The redirection release message may further contain a new redirection notification message to the MAG3, and the MAG1 returns a redirection release response to the LMA. In this manner, the MAG1 is notified to directly forward the packet to be sent to the CN to the MAG3 instead of forwarding the packet to the MAG2, thereby avoiding the packet misdelivery.

Further, in this embodiment, a part of the packet may be misdelivered to the MAG2 before the MAG1 receives the redirection release message. At this point, the CN no longer accesses the MAG2. In this case, when receiving the packet, the MAG2 finds that the destination node CN of the packet is no longer located within the control range of this MAG2, and then forwards the packet to the LMA through the tunnel, so as to make sure that the packet is not lost.

In practice, the CN may move out of the LMM domain controlled by the original LMA after the CN moves into the LMM domain. At this point, the new access device MAG3 attached to the CN belongs to a mobility management domain controlled by another LMA. Thus, the location information of the MAG3 may not be registered into the original LMA. In this manner, the redirection release message sent by the original LMA to the MN does not contain information of the new access device MAG3 attached to the CN. Definitely, the packet misdelivered to the MAG2 still needs to be returned to the LMA, so as to prevent the packet from being lost. In addition, when the CN is offline or powered off, the LMA may also send the redirection release message to the sending end node MN. Since the access device attached to the CN is not changed at this point, the redirection release message does not contain information of the new access device attached to the CN, and the packet delivered to the MAG2 does not need to be returned to the LMA.

The method in this embodiment can release the original route optimization path when the receiving end node moves or changes the access device attached thereto, thereby avoiding the packet misdelivery. Further, the original access device attached to the receiving end node may also be employed to check the destination of the packet and forward the misdelivered packet to the LMA, so as to make sure that the packet is not lost. Therefore, the foregoing implementations and effects of the present invention are further optimized.

The above descriptions are merely about the embodiments of the process and method of the present invention, and may not limit the scope of the invention. Any modifications, equivalent substitutions, and variations made within the spirit and principle of the present invention fall within the scope of the same.

What is claimed is:

1. A method of packet routing for a localized mobility management (LMM) network, comprising:
    determining that both a sending end node and a receiving end node are located in the same LMM domain controlled by a local mobility anchor point (LMA), comprising:
        determining whether a next hop delivery node belongs to the same LMM domain of the sending end node according to a destination address of the received packet sent by the access device attached to the sending end node,
        wherein the sending end node and the receiving end node are located in the same LMM domain controlled by the LMA if the next hop delivery node belongs to the same LMM domain of the sending end node;
    enabling a route optimization by sending a redirection notification message containing address information of the sending end node and the receiving end node to an access device attached to the sending end node, when receiving the redirection notification message, the access device attached to the sending end node returns a redirection notification response to the LMA;
    directly forwarding, by the access device attached to the sending end node, a packet to be sent to the receiving end node to an access device attached to the receiving end node; and
    forwarding, by the access device attached to the receiving end node, the packet to the receiving end node.

2. The method according to claim 1, wherein the redirection notification message has a validity period, and the packet to be sent to the receiving end node is directly forwarded by the access device attached to the sending end node to the access device attached to the receiving end node and then forwarded by the access device attached to the receiving end node to the receiving end node within the validity period of the redirection notification message.

3. The method according to claim 2, further comprising:
    querying, by the LMA, redirection notification message records within the validity period in access devices that are connected to the LMA whether the receiving end node changes the access device attached thereto or is offline or powered off;
    sending a redirection release message to the access device receiving the redirection notification message if receiving end node information in the redirection notification message records indicating that the receiving end node changed the access device attached thereto or is offline or powered off; and
    sending, by the access device, a redirection release response to the LMA after receiving the redirection release message.

4. The method according to claim 3, wherein if the receiving end node changes the access device attached thereto, and a new access device attached to the receiving end node and the access device attached to the sending end node are located in the same LMM domain of the LMA, the redirection release message carries information of the new access device being attached to the receiving end node.

5. The method according to claim 3, wherein after the receiving end node changes the access device attached thereto, the original access device attached to the receiving end node receives a packet directly sent from the access device attached to the sending end node and forwards the packet to be sent to the receiving end node that changes the access device attached thereto to the LMA.

6. The method according to claim 1, after the determining that both the sending end node and the receiving end node are located in the same LMM domain controlled by the LMA, further comprising: determining, by the LMA, whether to allow a route optimization or not according to a route optimization strategy deployed by the network and/or preset by an administrator, and if so, continuing enabling the route optimization.

7. The method according to claim 6, wherein if the access device attached to the sending end node and the access device attached to the receiving end node are only connected to the LMA, the LMA does not enable the route optimization.

8. The method according to claim 6, wherein if the network deploys to monitor traffic flow within the LMM network at the LMA, the LMA does not allow the route optimization.

9. The method according to claim 1, after the enabling the route optimization, further comprising: determining, by the access device attached to the sending end node, whether to allow a route optimization or not according to a route optimization strategy deployed by the network and/or preset by an administrator, and if so, continuing directly forwarding the packet to be sent to the receiving end node to the access device attached to the receiving end node, and then forwarding the packet to the receiving end node.

10. The method according to claim 9, wherein
when the LMA enables the route optimization by sending the redirection notification message containing the address information of the sending end node and the receiving end node to the access device attached to the sending end node, the access device attached to the sending end node obtains the route optimization strategy deployed by the network and/or preset by the administrator by means of:
carrying on the route optimization strategy deployed by the network and/or preset by the administrator in the redirection notification message sent by the LMA to the access device attached to the sending end node.

11. A system of packet routing for a localized mobility management (LMM) network, comprising:
a sending end node, a receiving end node, an access device attached to the receiving end node, a local mobility anchor point (LMA), and an access device attached to the sending end node, wherein the sending end node is connected to the access device attached to the sending end node, the LMA is respectively connected to the access device attached to the sending end node and the access device attached to the receiving end node, and the receiving end node is connected to the access device attached to the receiving end node;
the LMA is adapted to send a notification for enabling a route optimization when determining that both the sending end node and the receiving end node are located in an LMM domain controlled thereby; and
the access device attached to the sending end node is adapted to directly forward a packet to be sent to the receiving end node to the access device attached to the receiving end node after receiving the notification for starting the route optimization sent by the LMA;
wherein the LMA comprises a packet resolution module and a forward module, wherein:
the packet resolution module is adapted to receive the packet sent by the access device attached to the sending end node and examine the packet to determine a destination address of the packet before the route optimization is enabled, and send a message indicating that the sending end node and the receiving end node are located within a control range of the LMA after determining that both the sending end node and the receiving end node are located in an LMM domain controlled thereby according to the destination address of the packet; and
the forward module is adapted to send a notification for triggering the route optimization to the access device attached to the sending end node when receiving the message indicating that the sending end node and the receiving end node are located within the control range of the LMA sent by the packet resolution module.

12. The system according to claim 11, wherein the LMA further comprises a strategy decision module,
the packet resolution module is adapted to send the message indicating that the sending end node and the receiving end node are located within the control range of the LMA;
the strategy decision module is adapted to receive the message indicating that the sending end node and the receiving end node are located within the control range of the LMA, and send a message for allowing the route optimization if, according to a route optimization strategy deployed by the network and/or preset by an administrator, the route optimization is allowed; and
the forward module is adapted to receive the message for allowing the route optimization and send the notification for triggering the route optimization to the access device attached to the sending end node after receiving the message.

13. The system according to claim 12, wherein the access device attached to the sending end node is adapted to receive the notification for triggering the route optimization, and directly forward a packet to be sent to the receiving end node to the access device attached to the receiving end node when receiving the notification according to the route optimization strategy deployed by the network and/or preset by the administrator if the route optimization is allowed.

14. The system according to claim 11, wherein the access device attached to the sending end node and the access device attached to the receiving end node are media access gateways (MAGs) or access routers (ARs).

15. A local mobility anchor point (LMA) for implementing a route optimization, comprising:
a packet resolution module, a strategy decision module, and a forward module, wherein the packet resolution module is adapted to receive a packet and determine whether both a sending end node and a receiving end node of the packet are located in a localized mobility management (LMM) domain controlled by the LMA before a route optimization is enabled, and, if so, send a message indicating that the sending end node and the receiving end node are located within a control range of the LMA;
the strategy decision module is adapted to receive the message indicating that the sending end node and the receiving end node are located within the control range of the LMA, and send a message for allowing the route optimization if, according to a route optimization strategy deployed by the network and/or preset by an administrator, the route optimization is allowed; and
the forward module is adapted to receive the message for allowing the route optimization and send a notification for triggering the route optimization after receiving the message for allowing the route optimization.

* * * * *